G. C. OTRICH & J. L. BISCHOF.
MEANS FOR SECURING DENTAL PLATES IN POSITION.
APPLICATION FILED DEC. 18, 1913.
1,101,810.
Patented June 30, 1914.
Fig. 1.
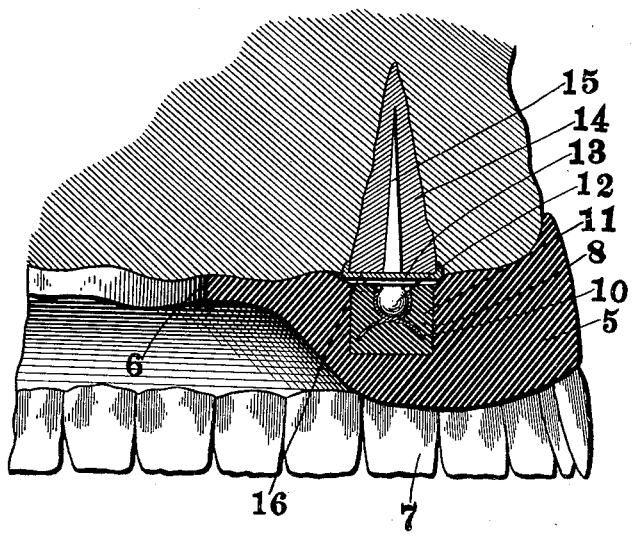
Fig. 2.
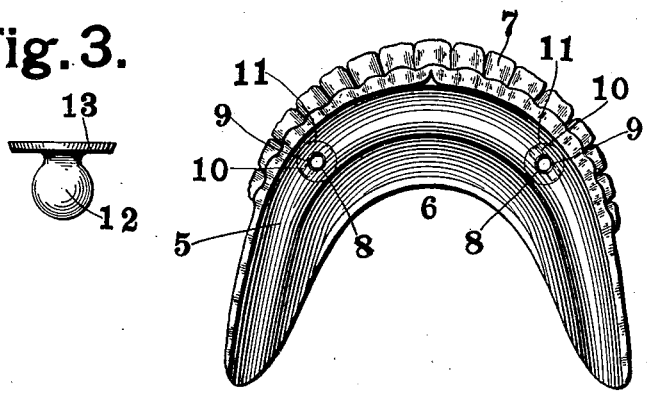
Fig. 3.
Fig. 4.
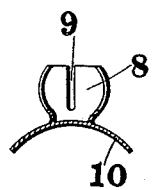

UNITED STATES PATENT OFFICE.

GROVER C. OTRICH AND JULIUS L. BISCHOF, OF BELLEVILLE, ILLINOIS.

MEANS FOR SECURING DENTAL PLATES IN POSITION.

1,101,810. Specification of Letters Patent. Patented June 30, 1914.

Application filed December 18, 1913. Serial No. 807,381.

*To all whom it may concern:*

Be it known that we, GROVER C. OTRICH and JULIUS L. BISCHOF, citizens of the United States of America, residing at Belleville, St. Clair county, State of Illinois, have invented a certain new and useful Means for Securing Dental Plates in Position, of which the following is such a full, clear, and exact description as will enable any one skilled in the art to which it appertains to make and use the same, reference being had to the accompanying drawings, forming part of this specification.

Our invention relates to means for securing dental plates in position, and, more particularly to a two-part spring clamping device, one member of which is adapted to be secured to a plate and the other to the jaw, so that the plate may be positively held in position by mechanical means, thus obviating the necessity of depending on suction to hold the plate in position.

In the accompanying drawings, which illustrate one form of device made in accordance with our invention, Figure 1 is a sectional view; Fig. 2 is a top plan view, showing the dental plate removed from the mouth; Fig. 3 is an enlarged side elevation of one member of the clamping device, and Fig. 4 is an enlarged sectional view of the other member of the clamping device.

Like marks of reference refer to similar parts in the several views of the drawings.

10 represents a dental plate which may be made of any suitable material, usually hard rubber. It will be noted that the palate 6 of the plate 5 may be cut almost entirely away, as shown in Fig. 2, inasmuch as suction is not necessary to hold the plate in position. The plate 5 carries the usual artificial teeth 7.

Embedded in the plate 5 are the socket members of the clamping device. Each of these socket members consists of a cup-shaped portion 8 provided with slots 9 to give it the required spring, and provided with an anchoring plate 10. If these members were embedded directly in the hard rubber of the plate 5, it would be impossible for the sides of the socket to properly expand and we, therefore, embed these members in plugs 11 of non-vulcanizable rubber. These plugs 11 are set into the plate 5 in the manner best shown in Fig. 1 of the drawings. Coöperating with these members 8, which are preferably two in number, as shown in Fig. 2 of the drawings, are a corresponding number of balls 12, each carried upon a disk 13, as best shown in Fig. 3. These balls 12 are adapted to be secured to the jaw in any suitable manner.

In Fig. 1, we have illustrated one method of securing the ball in position. In this method, a tooth 14 is cut off substantially level with the gum. In the interior of the tooth 14 is placed a platinum post 15 to which is secured a crown or coping 16 which covers the end of the tooth. The plate 13 may now be soldered directly to the crown or coping 16. It will be evident that when the socket members 8 are sprung over the balls 12, the plate will be firmly held in position in the mouth without the use of suction. The soft rubber of the plugs 11 not only allows the sides of the socket members 8 to spring outwardly when the plate is placed in position or removed, but they also act as buffers to cushion any jar which comes upon the plate, so that the said jar will not be transferred to the roots of the teeth.

Having fully described our invention, what we claim as new and desire to secure by Letters Patent of the United States is:

1. The combination with a dental plate, of a spring socket carried by said plate, and a member provided with a ball adapted to be secured to the jaw and to engage with said socket.

2. The combination with a dental plate comprising a body of rigid material and an inclosed portion of relatively soft material, of a clamping member embedded in said soft material, and a member coöperating with said clamping member and adapted to be secured to the jaw.

3. The combination with a dental plate, comprising a body of rigid material and an inclosed portion of relatively soft material, of a spring socket inclosed in said soft material, and a ball adapted to be secured to the jaw and to engage with said socket.

In testimony whereof, we have hereunto set our hands and affixed our seals in the presence of the two subscribing witnesses.

GROVER C. OTRICH. [L. S.]
JULIUS L. BISCHOF. [L. S.]

Witnesses:
ANTHONY J. STOECKEL,
EDGAR M. HERRMANN.

Copies of this patent may be obtained for five cents each, by addressing the "Commissioner of Patents, Washington, D. C."